(12) United States Patent
McBeath et al.

(10) Patent No.: US 8,494,454 B2
(45) Date of Patent: Jul. 23, 2013

(54) SYSTEM AND METHOD FOR REDUCING BLIND DECODING FOR CARRIER AGGREGATION

(75) Inventors: Sean McBeath, Keller, TX (US);
Mo-Han Fong, Ottawa (CA); Zhijun Cai, Irving, TX (US); Mark Earnshaw, Kanata (CA); Youn Hyoung Heo, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 341 days.

(21) Appl. No.: 12/792,098

(22) Filed: Jun. 2, 2010

(65) Prior Publication Data

US 2010/0304689 A1   Dec. 2, 2010

Related U.S. Application Data

(60) Provisional application No. 61/183,444, filed on Jun. 2, 2009, provisional application No. 61/293,276, filed on Jan. 8, 2010.

(51) Int. Cl.
*H04W 88/02* (2009.01)
*H04B 7/00* (2006.01)

(52) U.S. Cl.
USPC .............. 455/68; 455/419; 455/515; 455/450

(58) Field of Classification Search
USPC .............. 455/423, 450, 452.1, 451, 458, 509, 455/515, 511, 67.11, 68, 419, 434; 370/252, 370/329, 389
See application file for complete search history.

(56) References Cited

U.S. PATENT DOCUMENTS

| | | | |
|---|---|---|---|
| 6,285,886 B1 * | 9/2001 | Kamel et al. | 455/522 |
| 2008/0200203 A1 | 8/2008 | Malladi et al. | |
| 2009/0088148 A1 * | 4/2009 | Chung et al. | 455/423 |
| 2010/0303011 A1 | 12/2010 | Pan et al. | |
| 2011/0110441 A1 | 5/2011 | Chen et al. | |

FOREIGN PATENT DOCUMENTS

EP   1067704 A3   3/2005

OTHER PUBLICATIONS

Office Action issued in U.S. Appl. No. 12/792,116 on Jun. 4, 2012; 21 pages.
Office Action issued in U.S. Appl. No. 12/792,084 on Jul. 17, 2012; 7 pages.
Office Action issued in Canadian Application No. 2,759,080 on Aug. 8, 2012; 3 pages.
Alcatel-Lucent (R1-09-1781); "Support of Carrier Aggregation for FDD and Related Control Signalling" 3GPP TSG RAN WG#57 Meeting; San Francisco; May 4-8, 2009; 6 pages.

(Continued)

*Primary Examiner* — John J Lee
(74) *Attorney, Agent, or Firm* — Fish & Richardson P.C.

(57) ABSTRACT

A method for processing a control channel at a user agent (UA) to identify at least one of an uplink and a downlink resource grant within a wireless communication system wherein resource grants are specified by control channel element (CCE) subsets wherein each CCE subset is a control channel candidate, wherein the control channel is used for a plurality C of carriers, the method comprising the steps of, at the user agent, for each of the C carriers, (i) randomly identifying a UA specific search space including a control channel candidate subset for the carrier and (ii) attempting to decode each of the control channel candidates in the UA specific search space to identify at least one of an uplink and a downlink grant associated with the carrier.

8 Claims, 20 Drawing Sheets

OTHER PUBLICATIONS

Huawei (R1-090127); "PDCCH Design for Carrier Aggregation"; 3GPP TSG RAN WG1#55bis; Ljubljana, Slovenia; Jan. 12-16, 2009; 6 pages.

LG Electronics (R1-092237); "PDCCH Structure for Multiple Carrier Aggregation in LTE-Advanced"; 3GPP TSG RAN WG1 #57; San Francisco; May 4-8, 2009; 10 pages.

Motorola (R1-080731); "PDCCH Search Space Assignment and Signaling"; 3GPP TSG RAN1 #52; Sorrento, Italy; Feb. 11-15, 2008; 3 pages.

Motorola (R1-080079); "Search Space Definition: Reduced PDCCH Blind Detection for Split PDCCH Search Space"; 3GPP TSG RAN1#51bis; Sevilla, Spain; Jan. 14-18, 2008; 3 pages.

NEC (R1-061312); "CQI Reporting"; 3GPP TSG RAN WG1 Meeting #45; Shanghai, China; May 8-12, 2006; 4 pages.

Nokia, Nokia Siemens Networks (R1-090722); "DL Control Signalling to Support Extended Bandwidth"; 3gPP TSG-RAN WG1 Meeting #56; Athens, Greece; Feb. 9-13, 2009; 8 pages.

Panasonic (R1-092230, R-091743); "PDCCH Design for Carrier Aggregation"; 3GPP TSG-RAN WG1 Meeting #57; San Francisco; May 4-8, 2009; 10 pages.

Research in Motion UK Limited (R1-101099); "Blind Decoding for Carrier Aggregation"; 3GPP TSG RAN WG1 Meeting #60; San Francisco; Feb. 22-26, 2010; 4 pages.

International Search Report and Written Opinion of the International Searching Authority issued in International Application No. PCT/US2010/037102 on Sep. 14, 2010; 16 pages.

Written Opinion of the International Preliminary Examining Authority issued in International Application No. PCT/US2010/037102 on Jun. 28, 2011; 13 pages.

International Preliminary Report on Patentability issued in International Application No. PCT/US2010/037102 on Sep. 9, 2011; 35 pages.

International Preliminary Report on Patentability issued in International Application No. PCT/US2010/037108 on Aug. 29, 2011; 25 pages.

International Search Report and Written Opinion of the International Searching Authority issued in International Application No. PCT/US2010/037112 on Sep. 24, 2010; 15 pages.

International Preliminary Report on Patentability issued in International Application No. PCT/US2010/037112 on Aug. 29, 2011; 28 pages.

PCT International Search Report and Written Opinion, PCT/US2010/037108, Sep. 24, 2010.

LG Electronics, Randomization Function for PDCCH Search Space, 3GPP TSG RAN WG1#52bis, R1-081567, Shenzhen, China, Mar. 31-Apr. 4, 2008.

Catt, DL Control Channel Scheme for LTE-A, 3GPP TSG RAN WG1 Meeting #56bis, R1-091524, Seoul, Korea, Mar. 23-27, 2009.

Intel Corporation (UK) Ltd., PDCCH Search Space Design, 3GPP TSG RAN WG1 Meeting #61, R1-102811, Montreal, Canada, May 10-14, 2010.

Communication Pursuant to Article 94(3) EPC issued in European Application No. 10730894.2 on Sep. 11, 2012; 4 pages.

Office Action issued in U.S. Appl. No. 12/792,116 on Oct. 18, 2012; 23 pages.

Office Action issued in U.S. Appl. No. 12/792,084 on Dec. 7, 2012; 8 pages.

Office Action issued in Canadian Application No. 2,759,080 on Apr. 3, 2013; 3 pages.

Communication Pursuant to Article 94(3) EPC issued in European Application No. 10730894.2 on Apr. 26, 2013; 7 pages.

* cited by examiner

| Type | Aggregation Levels | Number of PDCCH (CCE Subset) Candidates |
|---|---|---|
| UA Specific Search SPace | 1 | 6 |
| | 2 | 6 |
| | 4 | 2 |
| | 8 | 2 |
| Common Search Space | 4 | 4 |
| | 8 | 2 |

Fig. 4

| Type | Aggregation Levels For Anchor Carrier | Aggregation Levels For Remaining Active Carriers |
|---|---|---|
| UA Specific Search SPace | 1 | 1 |
| | 2 | 2 |
| | 4 | 4 |
| | 8 | 8 |
| Common Search Space | 4 | 4 |
| | 8 | 8 |

Fig. 7

| Type | CCE Subset Candidates For Anchor Carrier | CCE Subset Candidates For Remaining Active Carriers |
|---|---|---|
| UA Specific Search SPace | 6 | 2 |
| | 6 | 2 |
| | 2 | 1 |
| | 2 | 1 |
| Common Search Space | 4 | 4 |
| | 2 | 2 |

Fig. 8

| Target Aggregation Level | Monitored Aggregation Level |
|---|---|
| 1 | 1, 2, 4, 8 |
| 2 | 2, 4, 8 |
| 4 | 4, 8 |
| 8 | 8 |

Fig. 10

| Target Aggregation Level | Monitored Aggregation Level |
|---|---|
| 1 | 1, 2 |
| 2 | 1, 2, 4 |
| 4 | 2, 4, 8 |
| 8 | 4, 8 |

Fig. 11

| Detected Aggregation Level On Anchor Carrier | Monitored Aggregation Levels On Non-Anchor Carriers |
|---|---|
| 1 | 1, 2 |
| 2 | 2, 4 |
| 4 | 4, 8 |
| 8 | 8 |

Fig. 12

| Reported CQI Value | Target Aggregation Level |
|---|---|
| 1-3 | 8 |
| 4-6 | 4 |
| 7-9 | 2 |
| 10-15 | 1 |

Fig. 13

| Type | Search Space $S_{k,c}^{(L)}$ | | Number Of PDCCH Candidates $M^{(L,c)}$ |
|---|---|---|---|
| | Agg Level L | Size (in CCEs) | |
| UA Specific Search SPace | 1 | 6 | 6 |
| | 2 | 12 | 6 |
| | 4 | 8 | 2 |
| | 8 | 16 | 2 |
| Common Search Space | 4 | 16 | 4 |
| | 8 | 16 | 2 |

Fig. 15

SYSTEM AND METHOD FOR REDUCING BLIND DECODING FOR CARRIER AGGREGATION

The present application claims priority to U.S. provisional patent application No. 61/183,444 which was filed on Jun. 2, 2009 and which is titled "System And Method For Reducing Blind Decoding For Carrier Aggregation" and also claims priority to U.S. provisional patent application No. 61/293,276 which was filed on Jan. 8, 2010 and which is titled "System And Method For Reducing Blind Decoding For Carrier Aggregation"

BACKGROUND

The present invention relates generally to data transmission in mobile communication systems and more specifically to methods for reducing blind decoding for carrier aggregation.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the term "access device" will refer to any component, such as a traditional base station or an LTE or LTE-A access device (including eNBs), that can provide a UA with access to other components in a telecommunications system.

In mobile communication systems such as the E-UTRAN, an access device provides radio access to one or more UAs. The access device comprises a packet scheduler for dynamically scheduling downlink traffic data packet transmissions and allocating uplink traffic data packet transmission resources among all the UAs communicating with the access device. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a scheduling channel.

Several different data control information (DCI) message formats are used to communicate resource assignments to UAs including, among others, a DCI format 0 for specifying uplink resources, DCI formats 1, 1A, 1B, 1C, 1D, 2 and 2A for specifying downlink resources, and DCI formats 3 and 3A for specifying power control information. Uplink specifying DCI format 0 includes several DCI fields, each of which includes information for specifying a different aspect of allocated uplink resources. Exemplary DCI format 0 DCI fields include a transmit power control (TPC) field, a cyclic shift demodulation reference signal (DM-RS) field, a modulating coding scheme (MCS) and redundancy version field, a New Data Indicator (NDI) field, a resource block assignment field and a hopping flag field. The downlink specifying DCI formats 1, 1A, 2 and 2A each include several DCI fields that include information for specifying different aspects of allocated downlink resources. Exemplary DCI format 1, 1A, 2 and 2A DCI fields include a HARQ process number field, an MCS field, a New Data Indicator (NDI) field, a resource block assignment field and a redundancy version field. Each of the DCI formats 0, 1, 2, 1A and 2A includes additional fields for specifying allocated resources. Other downlink formats 1B, 1C and 1D include similar information. The access device selects one of the downlink DCI formats for allocating resources to a UA as a function of several factors including UA and access device capabilities, the amount of data a UA has to transmit, the amount of communication traffic within a cell, etc.

LTE transmissions are divided into eight separate 1 millisecond sub-frames. DCI messages are synchronized with sub-frames so that they can be associated therewith implicitly as opposed to explicitly, which reduces control overhead requirements. For instance, in LTE frequency division duplex (FDD) systems, a DCI message is associated with an uplink sub-frame four milliseconds later so that, for example, when a DCI message is received at a first time, the UA is programmed to use the resource grant indicated therein to transmit a data packet in the sub-frame four milliseconds after the first time. Similarly, a DCI message is associated with a simultaneously transmitted downlink sub-frame. For example, when a DCI message is received at a first time, the UA is programmed to use the resource grant indicated therein to decode a data packet in a simultaneously received traffic data sub-frame.

During operation, LTE networks use a shared Physical Downlink Control CHannel (PDCCH) to distribute assignment messages including DCI messages amongst UAs. The DCI messages for each UA as well as other shared control information are separately encoded. The PDCCH includes a plurality of control channel elements (CCEs) that are used to transmit DCI messages from an access device to UAs. An access device selects one or an aggregation of CCEs to be used to transmit a DCI message to a UA, the CCE subset selected to transmit a message depending at least in part on perceived communication conditions between the access device and the UA. For instance, where a high quality communication link is known to exist between an access device and a UA, the access device may transmit data to the UA via a single one of the CCEs and, where the link is low quality, the access device may transmit data to the UA via a subset of two, four or even eight CCEs, where the additional CCEs facilitate a more robust transmission of an associated DCI message. The access device may select CCE subsets for DCI message transmission based on many other criteria.

Because a UA does not know exactly which CCE subset or subsets are used by an access device to transmit DCI messages to the UA, in existing LTE networks, the UA is programmed to attempt to decode many different CCE subset candidates when searching for a DCI message. For instance, a UA may be programmed to search a plurality of single CCEs for DCI messages and a plurality of two CCE subsets, four CCE subsets and eight CCE subsets to locate a DCI message. To reduce the possible CCE subsets that need to be searched, access devices and UAs have been programmed so that each access device only uses specific CCE subsets to transmit DCI messages to a specific UA corresponding to a specific data traffic sub-frame and so that the UA knows which CCE subsets to search. For instance, in current LTE networks, for each data traffic sub-frame, a UA searches six single CCEs, six 2-CCE subsets, two 4-CCE subsets and two 8-CCE subsets for DCI messages for a total of sixteen CCE subsets. The sixteen CCE subsets are a function of a specific Radio Network Temporary Identifier (RNTI) assigned to a UA 10 and vary from one sub-frame to the next. This search space that is specific to a given UA is referred to hereinafter as "UA specific search space".

Where an access device may transmit DCI messages in two or more DCI format sizes, a separate decoding attempt for each CCE subset candidate for each possible DCI format size is required. For instance, where two DCI format sizes are used, each of the 16 CCE subset candidates described above would have to be searched twice for a total of 32 searches or decoding attempts.

In addition to searching the UA specific search space, each UA also searches a common search space for each sub-frame. The common search space includes CCE subsets that do not change from sub-frame to sub-frame and that, as the label implies, are common to all UAs linked to an access device. For instance, in current LTE networks the common search space includes four 4-CCE subsets and two 8-CCE subsets for a total of six CCE subsets in the common search space. Here, as in the case of the UA specific search space, where there are two DCI format sizes, each of the six CCE subset in the common space is searched twice, once for each format size, and the total number of searches is twelve.

Hereinafter, unless indicated otherwise, CCE subsets that include one CCE will be referred to as "Aggregation level 1" subsets. Similarly, subsets that include two CCEs will be referred to as "Aggregation level 2" subsets, subsets that include four CCEs will be referred to as "Aggregation level 4" subsets, and subsets that include eight CCEs will be referred to as "Aggregation level 8" subsets.

Thus, in current LTE networks, a UE must perform a potential maximum of 44 blind decodes per traffic data sub-frame (e.g., 32 UA specific search space blind decodes and 12 common search space blind decodes) for each distinct RNTI value that is used to define a user-specific search space. (Currently for LTE, only one RNTI value per UA is used to define the user-specific search space for a given sub-frame.)

In many cases it is desirable for an access device to transmit a large amount of data to a UA or for a UA to transmit large amounts of data to an access device in a short amount of time. For instance, a series of pictures may have to be transmitted to an access device over a short amount of time. As another instance, a UA may run several applications that all have to receive data packets from an access device essentially simultaneously so that the combined data transfer is extremely large. One way to increase the rate of data transmission is to use multiple carriers (i.e., multiple frequencies) to communicate between an access device and UAs. For example, a system may support five different carriers (i.e. frequencies) and eight sub-frames so that five separate eight sub-frame uplink and five separate eight sub-frame downlink transmission streams can be generated in parallel. Communication via multiple carriers is referred to as carrier aggregation.

In the case of carrier aggregation, DCI message searching must be performed for each carrier employed. Thus, for instance, if a system uses five LTE carriers (with each carrier following the current LTE design), a UE must perform a potential maximum of 44 blind decodes per traffic data sub-frame per carrier for a total of 220 blind decodes. Thus, where large numbers (e.g., 220 per sub-frame) of blind decodes are required, battery charge can be depleted rapidly and processing requirements become excessive.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table showing aggregation levels for different UA-specific and common search spaces;

FIG. 7 is a table showing exemplary configuration aggregation levels for the anchor carrier and remaining active carriers;

FIG. 8 is a table showing a number of PDCCH candidates to decode for both an anchor carrier and remaining active carriers;

FIG. 10 is a table showing target aggregation levels of an anchor carrier and the resulting aggregation levels that are monitored by the UA of FIG. 1;

FIG. 11 is a table showing target aggregation levels of an anchor carrier and the resulting aggregation levels that are monitored by the UA of FIG. 1;

FIG. 12 is a table showing detected aggregation levels of an anchor carrier and the resulting aggregation levels to search on non-anchor carriers;

FIG. 13 is a table showing an example mapping of channel quality information (CQI) values to corresponding aggregation levels;

FIG. 15 is a table illustrating exemplary search space aggregation levels, CCE subset sizes and the number of PDCCH candidates;

DETAILED DESCRIPTION

Figure 1:
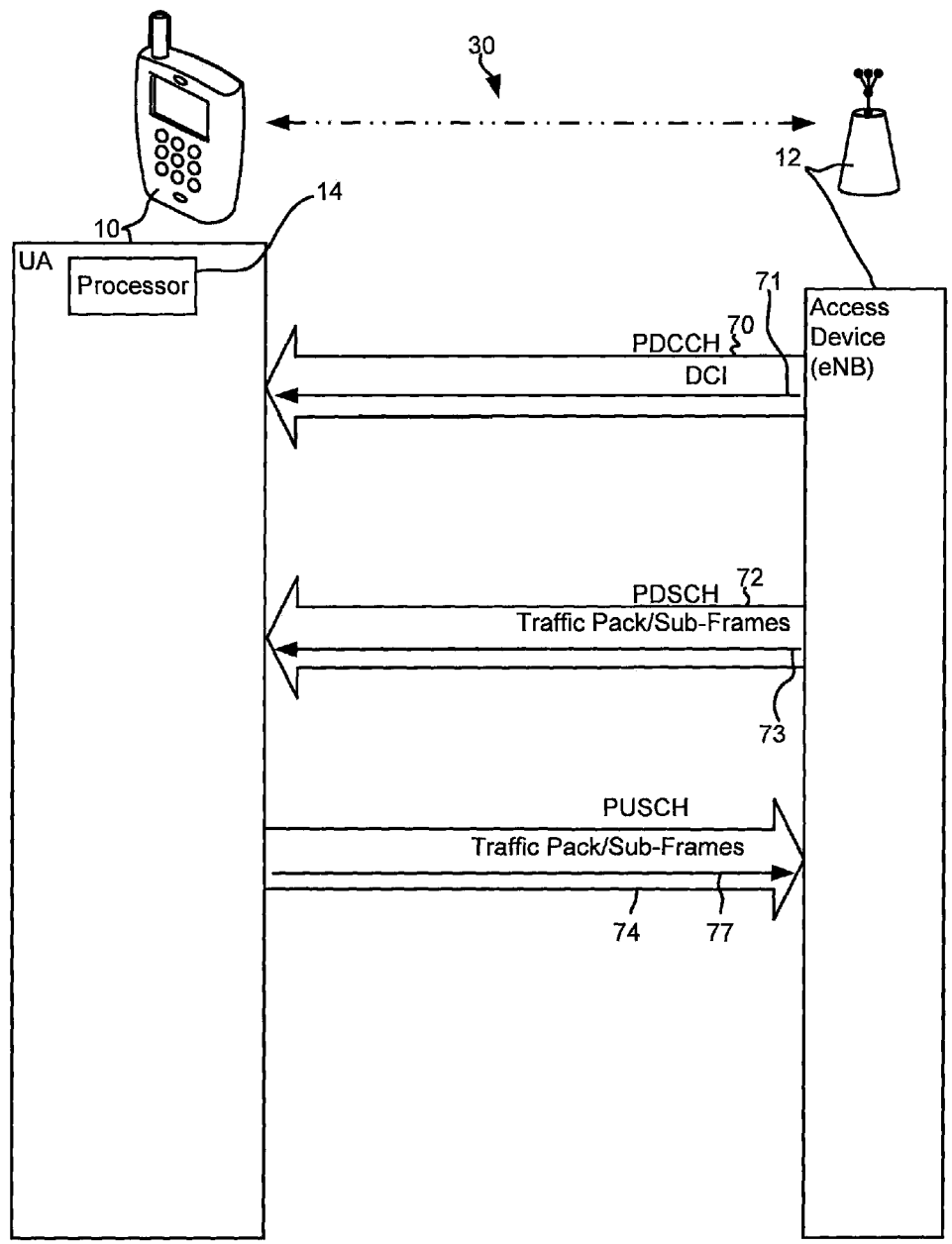
FIG. 1 is a schematic diagram showing components of a communication system including a user agent (UA) for implementing reduced blind decoding for carrier aggregation.

It has been recognized that the amount of blind decoding may be minimized in multi-carrier communication network systems.

To this end, some embodiments include a method for processing a control channel at a user agent (UA) to identify at least one of an uplink and a downlink resource grant within a wireless communication system wherein resource grants are specified by control channel element (CCE) subsets wherein each CCE subset is a control channel candidate, wherein the control channel is used for a plurality C of carriers, the method comprising the steps of, at the user agent, for each of the C carriers, (i) randomly identifying a UA specific search space including a control channel candidate subset for the carrier and (ii) attempting to decode each of the control channel candidates in the UA specific search space to identify at least one of an uplink and a downlink grant associated with the carrier.

In some cases the step of randomly identifying a UA specific search spaces for each carrier includes using a linear congruential random number generator. In some cases the random number generator uses a carrier index as an input. In some cases the step of randomly identifying a UA specific search space for each carrier includes identifying a UA specific search space on each carrier that is for the carrier. Some methods further include the step of, where a control channel candidate is successfully decoded, using the grant to facilitate communication. Still other methods further include the step of, where a control channel candidate is successfully decoded, using the grant to facilitate communication.

Other embodiments include an apparatus for processing a control channel at a user agent (UA) to identify at least one of an uplink and a downlink resource grant within a wireless communication system wherein resource grants are specified by control channel element (CCE) subsets wherein each CCE subset is a control channel candidate wherein the control channel is used for a plurality C of carriers, the apparatus comprising a user agent including a processor that is programmed to perform the steps of, for each of the C carriers, (i) randomly identifying a UA specific search space including a control channel candidate subset for the carrier and (ii) attempting to decode each of the control channel candidates in the UA specific search space to identify at least one of an uplink and a downlink grant associated with the carrier.

In some cases the processor performs the steps of randomly identifying UA specific search spaces by using a linear congruential random number generator. In some cases the random number generator uses a carrier index as an input. In some cases the processor performs the step of randomly identifying a UA specific search space for each carrier by identifying a UA specific search space on each carrier that is for the carrier. In some cases the processor is further programmed to perform the step of, where a control channel candidate is successfully decoded, using the grant to facilitate communication. In some cases the processor is further programmed to perform the step of, where a control channel candidate is successfully decoded, using the grant to facilitate communication.

Other embodiments include a method for processing a control channel at an access device to transmit at least one of an uplink and a downlink resource grant within a wireless communication system to a user agent wherein resource grants are specified by control channel element (CCE) subsets wherein each CCE subset is a control channel candidate wherein the control channel is used for a plurality C of carriers, the method comprising the steps of, at the access device, for each of the C carriers, (i) randomly identifying a UA specific search space including a control channel candidate subset for the carrier and (ii) using at least one of the control channel candidate subset candidates to transmit at least one of an uplink grant and a downlink grant to a UA.

In some cases the steps of randomly identifying a UA specific search space for each carrier includes identifying a UA specific search space on the carrier for the carrier. In some cases the step of randomly identifying UA specific search spaces includes using a linear congruential random number generator. In some cases the random number generator uses a carrier index as an input.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In general, the inventive system and methods have been developed to reduce the number of control channel element subsets that need to be searched for DCI messages as a function of communication system operating parameters which in turn reduces battery power required to facilitate DCI searching as well as reducing processing time dedicated to DCI searching. To this end, for instance, where a current standard specifies that the number of CCE subset searches (M) to be performed on each carrier for each sub-frame is 22, based on communication system operating parameters, the number for a given carrier may be reduced to N, a number less than 22, in any of several different ways which are described hereafter. This process of reducing the number of CCE subsets to be searched is performed dynamically as system operating parameters change in at least some embodiments. After N CCE subsets have been selected for a given carrier, the N subsets are blindly decoded to identify DCI formatted messages.

Referring now to the drawings wherein like reference numerals correspond to similar elements throughout the several views, FIG. 1 is a schematic diagram illustrating an exemplary multi-channel communication system 30 including a user agent (UA) 10 and an access device 12. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data. Access device 12, in one implementation, may include an E-UTRAN node B (eNB) or other network component for communicating with UA 10.

To facilitate communications, a plurality of different communication channels are established between access device 12 and UA 10. For the purposes of the present disclosure, referring to FIG. 1, the important channels between access device 12 and UA 10 include a Physical Downlink Control CHannel (PDCCH) 70, a Physical Downlink Shared CHannel (PDSCH) 72 and a Physical Uplink Shared CHannel (PUSCH) 74. As the label implies, the PDCCH is a channel that allows access device 12 to control UA 10 during downlink data communications. To this end, the PDCCH is used to transmit scheduling or control data packets referred to as downlink control information (DCI) packets to the UA 10 to indicate scheduling to be used by UA 10 to receive downlink communication traffic packets or transmit uplink communication traffic packets or specific instructions to the UA (e.g. power control commands, an order to perform a random access procedure, a semi-persistent scheduling activation or deactivation). A separate DCI packet may be transmitted by access device 12 to UA 10 for each traffic packet/sub-frame transmission.

Exemplary DCI formats include format 0 for specifying uplink resources and DCI formats 1, 1A, 1B, 1C, 1D, 2 and 2A for specifying downlink resources. Other DCI formats are contemplated. Exemplary DCI packets are indicated by communication 71 on PDCCH 70 in FIG. 1.

Referring still to FIG. 1, exemplary traffic data packets or sub-frames on PDSCH 72 are labeled 73. In at least some embodiments a traffic packet will be transmitted via the same carrier (i.e., the same frequency) as an associated DCI packet. The PUSCH 74 is used by UA 10 to transmit data sub-frames or packets to access device 12. Exemplary traffic packets on PUSCH 74 are labeled 77.

Figure 2:
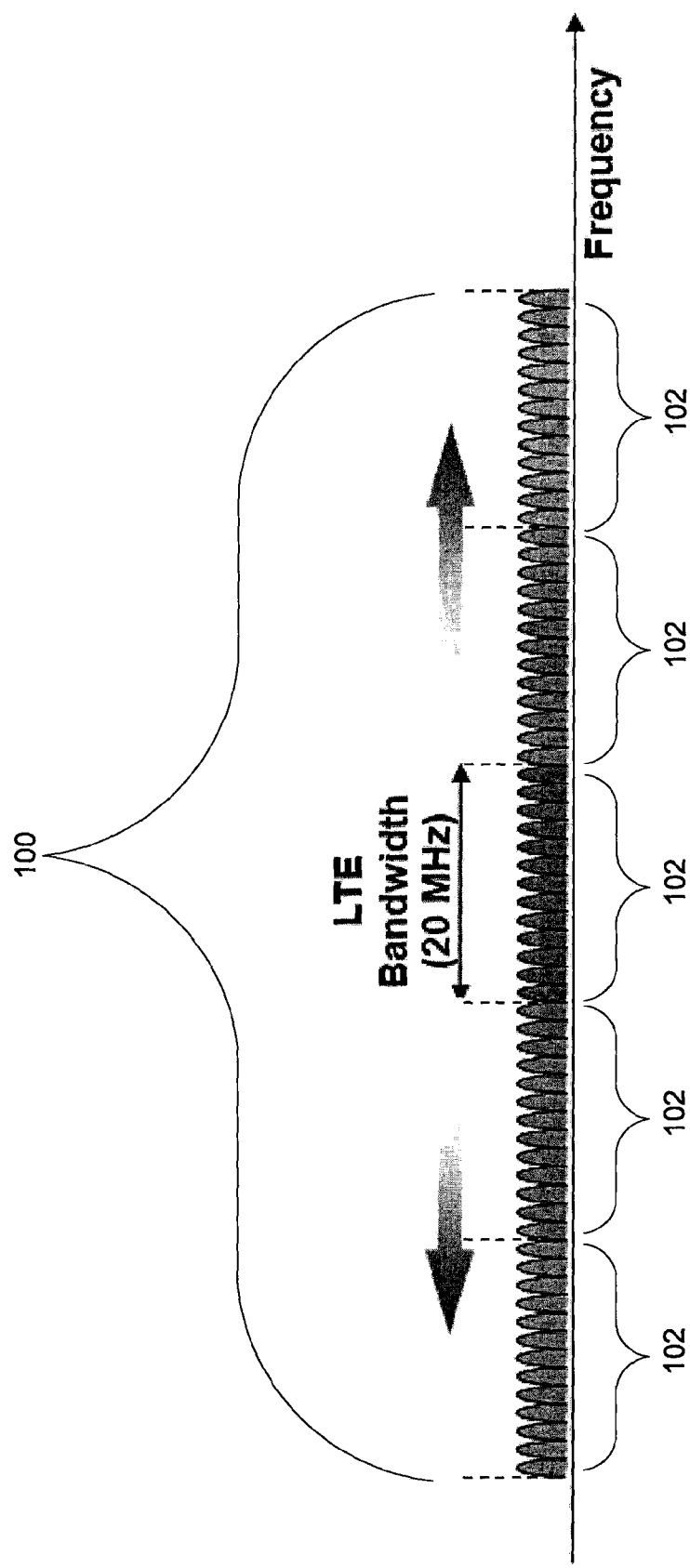
FIG. 2 is an illustration of carrier aggregation in a communications network where each component carrier has a bandwidth of 20 MHz and the total system bandwidth is 100 MHz.

Carrier aggregation is used to support wider transmission bandwidths and increase the potential peak data rate for communications between UA 10, access device 12 and/or other network components. In carrier aggregation, multiple component carriers are aggregated and may be allocated in a sub-frame to a UA 10 as shown in FIG. 2. FIG. 2 shows carrier aggregation in a communications network where each component carrier has a bandwidth of 20 MHz and the total system bandwidth is 100 MHz. As illustrated, the available bandwidth 100 is split into a plurality of carriers 102. UA 10 may receive or transmit on multiple component carriers (up to a total of five carriers 102 in the example shown in FIG. 2), depending on the UA's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

Figure 3:
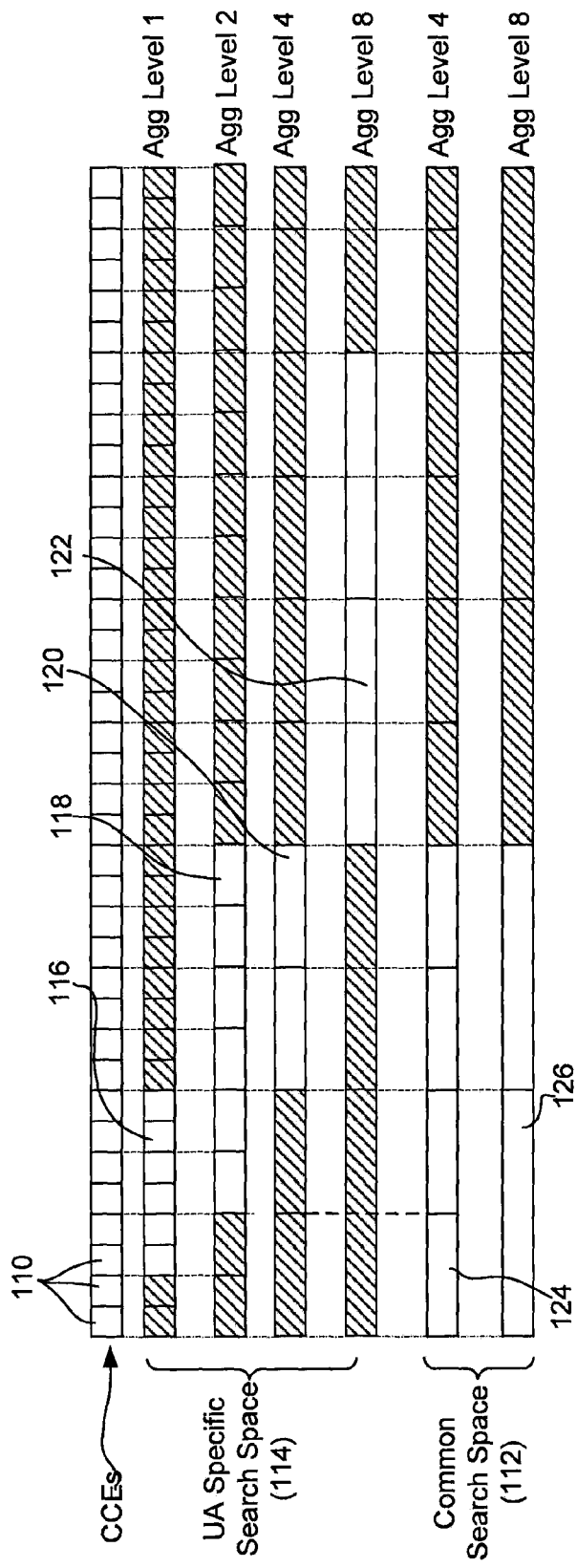
FIG. 3 is an illustration of aggregation levels and search spaces that may be present within the PDCCH.

Referring to FIG. 3, an exemplary PDCCH includes a plurality of control channel elements (CCEs) 110 that are used to transmit DCI formatted messages from access device 12 to UA 10. In the illustrated example the PDCCH includes thirty-eight CCEs. In other embodiments other numbers of CCEs may be employed. Access device 12 selects one or an aggregation of CCEs to be used to transmit a DCI message to UA 10, the CCE subset selected to transmit a message depending at least in part on perceived communication conditions between the access device and the UA. For instance, where a high quality communication link is known to exist between an access device and a UA, the access device may transmit data to the UA via a single one of the CCEs (see 116) and, where the link is low quality, the access device may transmit data to the UA via a subset of two (see 118), four (see 120) or even eight CCEs (see 122), where the additional CCEs facilitate a more robust transmission of an associated DCI message. The access device may select CCE subsets for DCI message transmission based on many other criteria.

In current LTE networks, because UA 10 does not know exactly which CCE subset or subsets (e.g., 116, 118, 120, 122, etc.) are used by an access device to transmit DCI messages to UA 10, UA 10 is programmed to attempt to decode many different CCE subset candidates when searching for a DCI message. For instance, UA 10 may be programmed to search a plurality of single CCEs for DCI messages and a plurality of two CCE subsets, four CCE subsets and eight CCE subsets to locate a DCI message.

To reduce the possible CCE subsets that need to be searched by a UA 10, access devices and UAs have been programmed so that each access device only uses specific CCE subsets to transmit DCI messages to a specific UA 10 corresponding to a specific data traffic sub-frame and so that the UA knows which CCE subsets to search. For instance, as shown in FIG. 3, in current LTE networks, for each data traffic sub-frame, a standard requires a UA to search six single CCEs (see exemplary clear single CCEs 116), six 2-CCE subsets (see exemplary six clear subsets 118), two 4-CCE subsets (see exemplary two clear subsets 120) and two 8-CCE subsets (see exemplary two clear subsets 120) for DCI messages for a total of sixteen CCE subsets. The sixteen CCE subsets vary pseudo-randomly for different sub-frames as a function of a UA's assigned RNTI value. This search space that is specific to a given UA is referred to hereinafter as "UA specific search space" 114.

Referring still to FIG. 3, in addition to searching UA specific search space 114, UA 10 also searches a "common search space" 112 for each sub-frame. Common search space 112 includes CCE subsets that do not change from sub-frame to sub-frame and that, as the label implies, are common to all UAs communicating with an access device 12. For instance, in current LTE networks the common search space includes four 4-CCE subsets (see exemplary four clear subsets 124) and two 8-CCE subsets (see exemplary two clear subsets 126) for a total of six CCE subsets in common search space 112. In at least some implementations common search space 112 may begin at CCE 0 within the PDCCH and continue to CCE 15 as shown in FIG. 3.

Thus, in current LTE networks a total of twenty-two different CCE subsets may be searched for each sub-frame. Where a system employs DCI messages in which the UE is configured to decode DCI messages that have two different lengths, a total of 44 different decoding attempts may be required for each sub-frame, a separate decode attempt for each CCE subset-DCI format length combination.

Hereinafter, unless indicated otherwise, CCE subsets that include one CCE will be referred to as "Aggregation level 1" subsets. Similarly, subsets that include two CCEs will be referred to as "Aggregation level 2" subsets, subsets that include four CCEs will be referred to as "Aggregation level 4" subsets, and subsets that include eight CCEs will be referred to as "Aggregation level 8" subsets. A higher aggregation level indicates that the number of CCEs used to transmit a particular DCI is larger (e.g., aggregation level 8 is higher than aggregation level 4) and is therefore more robust assuming a given set of channel conditions. Accordingly, UA's 10 with poor channel conditions may be assigned higher aggregation levels to ensure the UAs 10 can successfully decode DCI messages received on the PDCCH.

Referring now to FIG. 4, a table is provided that summarizes the information in FIG. 3 by showing aggregation levels for the UA-specific and common search spaces 114 and 112, respectively, and the number of PDCCH (CCE subset) candidates to be searched by UA 10 at each aggregation level. In UA-specific search space 114, at aggregation levels 1 and 2, there are 6 PDCCH or CCE subset candidates each, and at aggregation levels 4 and 8, there are 2 PDCCH candidates each. In common search space 112, at aggregation level 4 there are 4 PDCCH candidates and at aggregation level 8 there are 2 PDCCH candidates.

For carrier aggregation, where separate coding is used for each carrier's PDCCH, the blind decoding requirements for UA 10 can become prohibitive. Blind decoding directly affects UA 10 battery life and UA 10 processing requirements. Reducing the maximum possible number of required blind decodes not only reduces the computational expense of performing blind decodes, but also reduces the amount of time required to perform the blind decodes.

The present disclosure describes several different ways to reduce the amount of UA blind decoding in multi-carrier communication networks. While each solution is described separately below, it should be appreciated that various aspects of the different solutions may be combined in at least some embodiments to result in other useful solutions. In at least some embodiments access device 12 determines an appropriate subset of CCE subsets to be monitored by each UA 10, encodes the subset information and transmits the subset information to each UA 10 so that each UA 10 decodes only a subset of available CCE subsets and aggregation levels within the PDCCH. Alternatively, each UA 10 may independently determine a subset of the CCE subset candidates to be searched/decoded. Here, UA 10 may rely upon information known to both UA 10 and access device 12 to identify the subset. The information may include the quality of the connection between access device 12 and UA 10, previous traffic flow between UA 10 and access device 12, previous CCE subset search results on one or more carriers, or any other information known to both access device 12 and UA 10.

Solution 1

Figure 5:
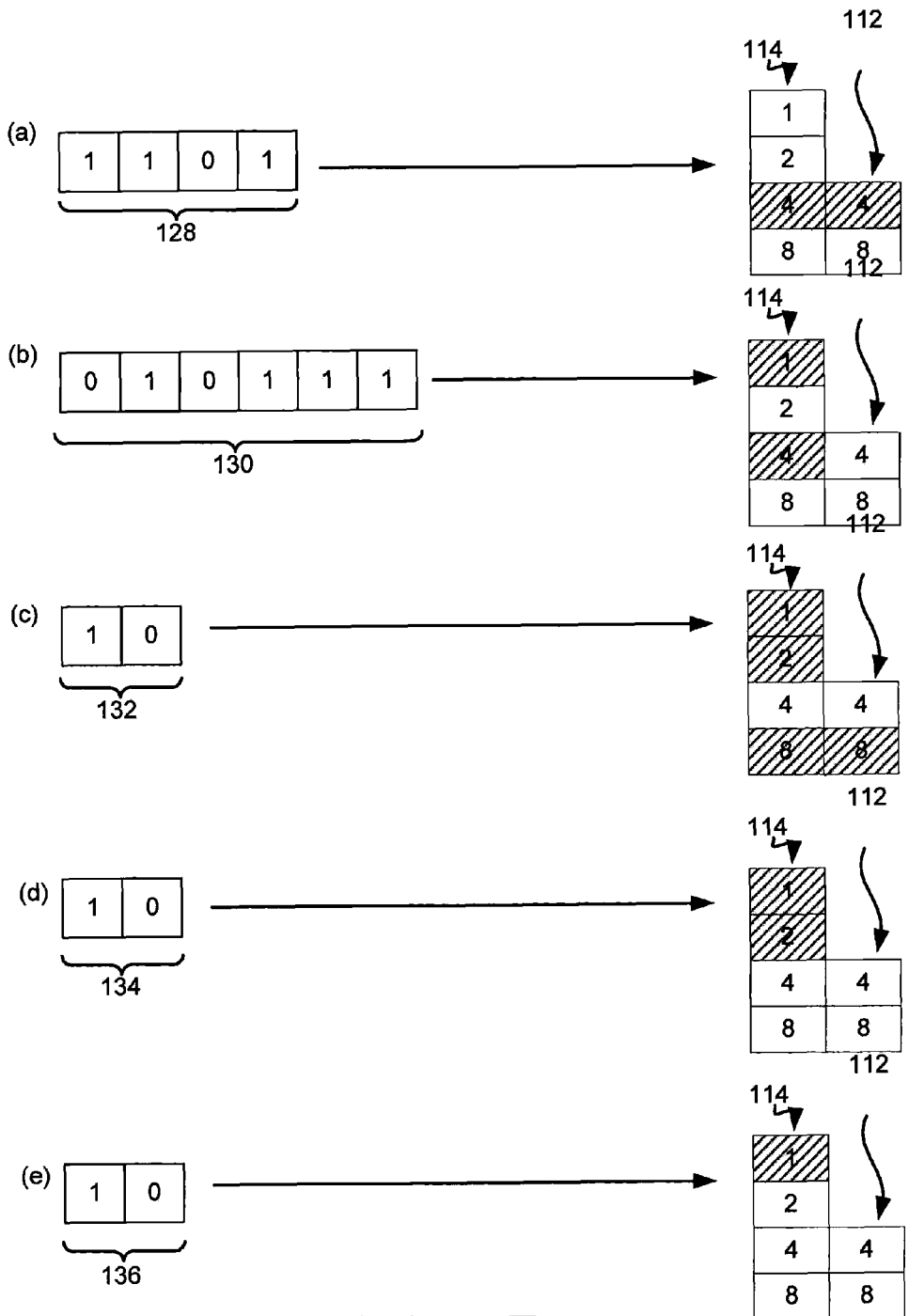
FIGS. 5a-5e illustrate various field formats for signaling aggregation levels to be searched by a UA.

Referring again to FIG. 1, in some embodiments, access device 12 is programmed to transmit a message to UA 10 indicating a reduced subset of aggregation levels to be searched. As one alternative, this message may take any of several different forms including a DCI message, a MAC control element, an RRC message, etc., where the message includes a information field which is used to determine the blind decoding rule, for example, "decode rule field". Exemplary decode rule field formats are illustrated in FIG. 5(*a*) through 5(*e*). In FIGS. 5(*a*)-5(*e*), elements identified by numeral 114 comprise varying aggregation levels in UA-specific search space 114 (see again FIG. 3) that may be enabled for searching and elements identified by numeral 112 comprise varying aggregation levels in common search space 112 (see FIG. 3) that may be enabled for searching. Enabled aggregation levels are shown as clear and disabled levels are shown in cross hatch.

With specific reference to FIG. 5(*a*), a four-bit field 128 is used to specify the aggregation levels that are enabled (or disabled) for a particular UA 10. In FIG. 5(*a*), the first bit in the field corresponds to aggregation level 1 in UA-specific search space 114, the second bit to aggregation level 2 in UA-specific search space 114, the third bit to aggregation level 4 in UA-specific search space 114 and common search space 112, and the fourth bit to aggregation level 8 in UA-specific search space 114 and common search space 112. In FIG. 5(*a*), bits 1, 2, and 4 are set to 1, while bit 3 is set to 0. As such, aggregation levels 1, 2, and 8 are enabled, while aggregation level 4 is disabled.

In FIG. 5(*b*), six-bit field 130 extends the concept illustrated in FIG. 5(*a*). In FIG. 5(*b*), six-bit field 130 allows aggregation levels in both the UA-specific search spaces 114 and common search spaces 112 to be individually enabled or disabled. The first four bits of six-bit field 130 correspond to the four aggregation levels in the UA-specific search space 114, and the last two bits in the field correspond to the two aggregation levels in the common search space 112.

In FIG. 5(*c*), two-bit field 132 specifies one of the four possible aggregation levels as the target aggregation level for which searching should be performed. In this example, only the specified aggregation level is searched by UA 10. In FIG. 5(*c*), two-bit field 132 is mapped to various aggregation levels in accordance with the following rules: a two-bit field 132 value of '00' indicates aggregation Level 1 in UA-specific search space 114, a value of '01' indicates aggregation level 2 in UA-specific search space 114, a value of '10' indicates aggregation level 4 in UA-specific search space 114 and common search space 112, and a value of '11' indicates aggregation level 8 in UA-specific search space 114 and common search space 112. In FIG. 5(*d*), two-bit field 134 specifies a target aggregation level. In this example, the target aggregation level and all higher aggregation levels are searched. The same example field-to-aggregation-level mappings as described for FIG. 5(*c*) may be implemented in the present example.

In FIG. 5(*e*), two-bit field 134 specifies a target aggregation level. In this example, however, the target aggregation level in addition to the immediately adjacent aggregation levels are searched by UA 10 (i.e., aggregation levels immediately above and below the target level specified by two-bit field 134). The same example field-to-aggregation-level mappings as for FIGS. 5(*c*) and 5(*d*) may be implemented in the present example.

In each of the examples of FIGS. 5(*a*) through 5(*e*), the identified aggregation levels may apply to a single carrier or to multiple carriers. In addition, the two-bit field formats of FIGS. 5(*c*) through 5(*e*) may apply to the UA-specific search area, the common search area, or both. The exact configuration could be determined via pre-set rules and/or higher layer signaling. This information field can be carried in the PDCCH signaling, MAC Control elements or the RRC signaling. In another alternative, the "decode rule field" may be hard-coded in the UA 10 which may reduce the signaling overhead.

Solution 2

In other embodiments UA 10 is assigned a set of active carriers and one of the active carriers is assigned as an anchor carrier. Here, an active carrier is a carrier for which UA 10 is buffering received symbols for potential traffic and control reception. The CCE subsets of active carriers are searched in a specific order, beginning with the anchor carrier. Here, each DCI format is configured to contain an additional signaling bit in a "search continue field" to indicate whether searching should continue (e.g., signaling bit='1', indicating there are more DCIs to be found) or whether searching should terminate (e.g., signaling bit='0', indicating there are no more DCIs to be found). If a new DCI format is defined, an extra signaling bit or search continue field may be added to any new DCI formats. Alternatively, padding bits in existing DCI formats may be used to provide the additional signaling bit. Currently, any padding bits that are added to the current DCI formats to satisfy certain length constraints (see section 5.3.3.1 of 36.212) have a value of 0. The padding bits (if present) may therefore be used as signaling bits. Finally, if no padding bits are available and the DCI formats remain unchanged, one of the existing bits may be redefined to indicate whether searching should continue. Example existing bits that may be reassigned to provide this functionality includes one of the PUCCH or PUSCH power control bits.

Figure 6:
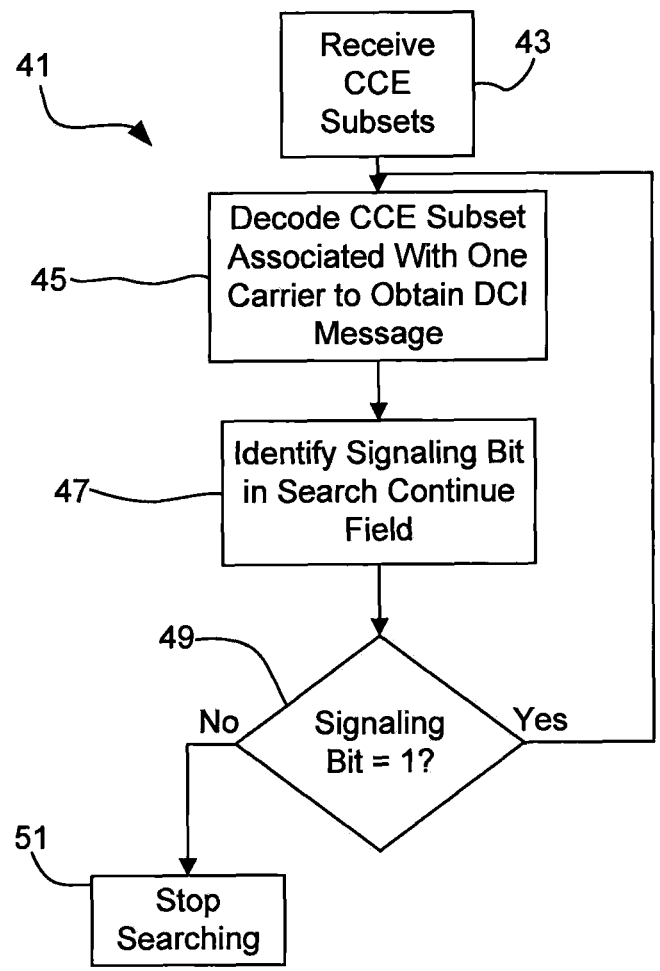
FIG. 6 is a flow chart illustrating one method for indicating if additional carriers should be searched via a DCI message.

Referring to FIG. 6, an exemplary process 41 consistent with this solution is illustrated. At block 43 CCEs are received on one or multiple PDCCHs. At block 45, the CCE subsets are decoded on one carrier to obtain a DCI message. At block 47 the signaling bit in the search continue field is identified. At block 49, where the signaling bit value is "1", control passes back up to block 45 where CCE subsets associated with the next carrier are searched for DCI messages. At block 49, when the signaling bit is "0", searching stops at block 51 for the sub-frame.

In this implementation, if a missed detection occurs on one of the PDCCHs, UA 10 continues to search for further DCIs because UA 10 considers the last signaling bit that it has seen to have a value of 1. A false detection may cause difficulties, but the probability of a false detection (false positive) is lower than that of a missed detection (false negative). Some additional search rules as described in the present disclosure (e.g., only aggregation levels greater than or equal to the aggregation level used on the anchor carrier are used) may be implemented in combination with the search continue field.

Alternatively, one or more DCI messages may contain an indication of the total number of DCI messages for UA 10. Upon detection of such a message, the UA 10 knows how many DCI messages are intended for it in the current sub-frame. Upon detection of the indicated number of DCI messages, the UA 10 can stop searching. This allows UA 10 to know when to stop searching, regardless of the search algorithm and may allow some implementation specific techniques for reducing blind decoding. Alternatively, one or more DCI messages may contain an index for the next component carrier that UA 10 should search which may contain more DCIs for the UA 10.

Solution 3

In some embodiments access device 12 may indicate to UAs 10 whether a particular aggregation level is supported using higher layer (e.g., RRC) signaling for each UA 10 and, potentially, for each UA 10 on each carrier. Because multiple carriers may be allocated to UAs 10 having good channel conditions, smaller aggregation levels may be sufficient to transmit DCI messages.

FIG. 7 is a table showing exemplary configuration aggregation levels for an anchor carrier and remaining active carriers wherein levels to be searched are shown as clear and levels that are not to be searched are shown in cross hatch. In FIG. 7, UA 10 is configured to decode the aggregation level 1, 2, and 8 CCE subsets on the anchor carrier in the UA-specific search space and aggregation level 4 and 8 CCE subsets in the common search space. UA 10 is also configured to decode the aggregation level 1 and 2 CCE subsets on the non-anchor carriers in the UA-specific search space and aggregation level 4 and 8 CCE subsets in the common search space. The CCE subsets can be indicated to the UA for example using the message illustrated in FIG. 5b.

In other embodiments higher layer signaling may indicate the number of CCE subset candidates to be searched for each aggregation level and each carrier. To this end, see FIG. 8 that shows a table indicating that a UA 10 is configured to decode a full complement of CCE subsets for an anchor carrier and to decode a limited subset of the CCE subset candidates for the remaining active carriers. There are many types of signaling which could be used to support this configuration. In another embodiment, the number of CCE subset candidates to be searched for each aggregation level and each carrier may be pre-set by the standards or hard-coded in the UA 10.

In some implementations, a total number of CCE subset candidates may be established for the non-anchor carriers where the total number of CCE subset candidates are distributed (either evenly or unevenly) among the non-anchor carriers. Alternatively, a total number of candidates is established for all carriers, which are distributed among all the carriers (including, for example, anchor and non-anchor carriers). For example, a UA 10 may be configured to support decoding a maximum of 44 CCE subsets regardless of the number of carriers currently being used. Upon determining the number of carriers to monitor, the UA distributes the 44 decoding attempts among the carriers. For example, if the anchor carrier is always allocated 22 CCE subsets as in FIG. 3, then there are 22 CCE subsets available for the remaining active carriers. If the UA 10 is currently monitoring 2 non-anchor carriers, then each carrier is allocated 11 CCE subsets, which are distributed among the supported aggregation levels.

Solution 4

In some embodiments higher layer signaling at the RRC level specifying which aggregation levels or CCE subsets a particular UA 10 should monitor may be slow and incur significant overhead. Where a UA's transmission channel is varying, for example, some dynamic tracking may be required so that a UA 10 can be instructed to monitor small aggregation levels (e.g., aggregation levels of 1 or 2) when the UA's transmission channel is good and large aggregation levels (e.g., aggregation levels of 4 or 8) when the UA's transmission channel is poor. For a mobile UA 10, RRC signaling may be unable to quickly track a change in transmission channel quality. As such, contact with the UA 10 may be lost if UA 10's transmission channel suddenly degrades faster than access device 12 is able to react.

Figure 9:
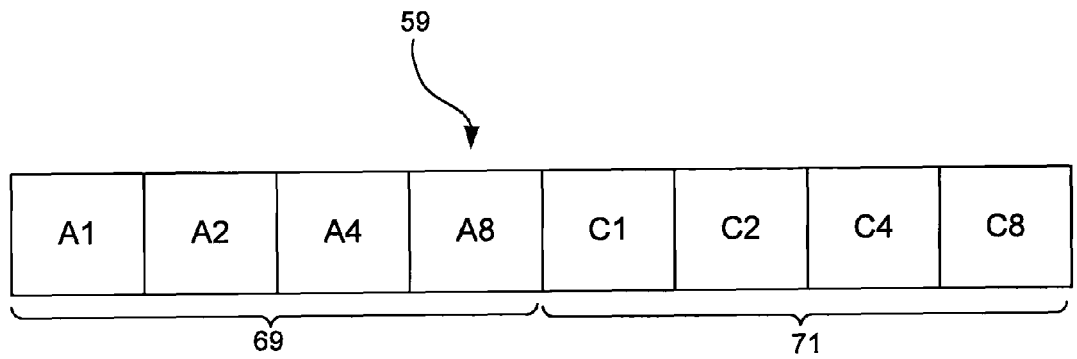
FIG. 9 illustrates a MAC control element for signaling which aggregation levels a UA should monitor on multi-carrier PDCCHs.

An alternative to RRC signaling includes a new MAC control element that allows access device 12 to signal changes in the aggregation levels that a UA 10 should search. Referring to FIG. 9, an exemplary MAC control element 59 is illustrated for signaling which aggregation levels a UA 10 should monitor on multi-carrier PDCCHs. In FIG. 9, a value of 1 in the corresponding bit position means that UA 10 should monitor that aggregation level in the anchor carrier's, or non-anchor carrier's PDCCH, as appropriate, while a value of 0 means that UA 10 does not need to monitor the corresponding aggregation level. Accordingly, flags A1, A2, A4 and A8 in FIG. 9 indicate the aggregation level for the anchor carrier, while flags C1, C2, C4 and C8 indicate the aggregation level for non-anchor carriers. The example MAC control element illustrated in FIG. 9 has a fixed payload length of one byte. For cases involving non-adjacent (in frequency) carriers, a four-bit field (C1, C2, C4, C8) may be provided for each of the distinct carriers used by UA 10. The encoding of 69 and 71 can for example be as in FIG. 5a.

The MAC control element of FIG. 9 is exemplary only. Other MAC control element variations may be implemented. For example, aggregation level flags may be provided separately for the common and UA-specific search areas (e.g., a total of 6 bits for example as in FIG. 5b instead of the 4 shown in FIG. 9). Alternatively, rather than group all of the non-anchor carriers together, desired aggregation levels may be signaled separately for each of the distinct bands that the UA's carriers belong to because, for example, the path loss for carriers at different frequencies may be different. Also, instead of binary flags that indicate which specific aggregation levels are enabled or disabled, a two-bit field may be used to signal the target aggregation level for each distinct carrier or band for example using a message as in FIGS. 5c, 5d, and 5e.

In various implementations, UA 10 may be programmed to search only at the target aggregation level (for either the anchor and/or non-anchor carriers) for example using a message as in FIG. 5c. In other implementations UA 10 may be programmed to search beginning with a specified aggregation level and continuing with any higher aggregation levels as shown in FIG. 10 for example using a message as in FIG. 5d. In still other embodiments UA 10 may be programmed to search at a target aggregation level and in the immediately adjacent aggregation levels as shown in FIG. 11 for example using a message as in FIG. 5e.

To minimize the likelihood that contact with a particular UA 10 is lost, access device 12 may be configured to ensure that successive transmissions of the MAC control element have at least one enabled aggregation level in common with one another, and that this common aggregation level(s) will be used until access device 12 becomes reasonably certain (e.g., passes a pre-defined certain threshold) that UA 10 has successfully received the MAC control element (e.g., no further HARQ retransmissions of the MAC PDU containing that MAC control element are required).

For example, a UA 10 may be instructed to monitor aggregation levels 1, 2, and 4. If the UA's transmission channel then degrades, access device 12 may wish to use higher aggregation levels when communicating with UA 10. To this end, access device 12 reconfigures UA 10 to use aggregation levels 4 and 8 (because communication at aggregation level 1 may be prone to error or other difficulties). In that case, access device 12 temporarily uses only aggregation level 4 for all PDCCH transmissions allowing UA 10 to decode those PDCCH transmissions regardless of whether the old or new aggregation level configuration was in use (and ensuring UA 10 receives instructions regarding the change in active aggregation levels). In the example, access device 12 may continue using aggregation level 4 for a pre-defined period of time until access device 12 determines, with a sufficient level of certainty, that UA 10 has applied the new aggregation level configuration. In that case, the contents of the MAC control element may be configured to be applied at a fixed time (e.g., four sub-frames) after the control element has been successfully received at UA 10.

Solution 5

In some embodiments the number of aggregation levels that a UA 10 searches on the PDCCH is at least partially determined by the downlink channel quality information (CQI) values detected by UA 10. Generally, a low CQI value corresponds to poor transmission channel conditions. In poor transmission channel conditions, access device 12 may be configured to use a large aggregation level on the PDCCH for more robust communication with UA 10. Similarly, a high CQI value corresponds to good transmission channels, and, in that case, access device 12 may be configured to use a small aggregation level on the PDCCH for more efficient communication with UA 10. As such, UA 10 may track the CQI values that have recently been reported to access device 12 and use the CQI information to determine which aggregation levels should be searched on the PDCCH based upon a pre-determined algorithm.

In one example, CQI values are mapped to corresponding aggregation levels. FIG. 13 is a table showing an example mapping of CQI values to corresponding aggregation levels. CQI values of 1 to 3 (indicating a low-quality communication channel) map to aggregation level 8. CQI values of 4 to 6 map to an aggregation level of 4 and CQI values of 7-9 map to an aggregation level of 2. CQI values of 10 to 15 (indicating a high-quality communication channel) map to an aggregation level of 1. The mapping shown in FIG. 13 is exemplary and may be adjusted based upon various system requirements.

To provide additional flexibility to the operation of access device 12, UA 10 may also monitor aggregation levels immediately adjacent to the target aggregation levels. FIG. 11 is a table showing exemplary target aggregation levels of FIG. 13, with a listing of the resulting aggregation levels that are monitored by UA 10. A target aggregation level of 1 results in levels 1 and 2 being monitored. A target aggregation level of 2 results in levels 1, 2 and 4 being monitored. A target aggregation level of 4 results in levels 2, 4 and 8 being monitored. A target aggregation level of 8 results in levels 4 and 8 being monitored. In addition, whenever UA 10 changes its target aggregation level, it may monitor the aggregation levels associated with both the old and new target aggregation levels for a certain period of time in order to allow access device 12 sufficient time to adjust.

Solution 6

In yet other embodiments UA 10 searches the anchor carrier over all aggregation levels. Upon detection of a valid PDCCH (i.e., a valid DCI message), UA 10 searches the remaining carriers using the aggregation level associated with the valid DCI message received on the anchor carrier and one or more other aggregation levels based on a rule set that is either pre-defined or configured using higher layer signaling. For example, UA 10 may search the remaining carriers using the aggregation level associated with the valid DCI message on the anchor carrier and the next most robust aggregation level. FIG. 12 is a table showing the detected aggregation level of an anchor carrier and the resulting aggregation levels to search on non-anchor carriers consistent with this example. If a valid PDCCH candidate is detected on aggregation level 1 of the anchor carrier, levels 1 and 2 are monitored on the other active carriers. If a valid PDCCH candidate is detected on aggregation level 2 of the anchor carrier, levels 2 and 4 are monitored on the other active carriers. If a valid PDCCH candidate is detected on aggregation level 4 of the anchor carrier, levels 4 and 8 are monitored on the other active carriers. If a valid PDCCH candidate is detected on aggregation level 8 of the anchor carrier, level 8 is monitored on the other active carriers.

In the example illustrated in FIG. 12, if UA 10 is unable to find a grant on the anchor carrier, UA 10 may be configured to search a pre-defined aggregation level on each of the non-anchor carriers. This approach may be implemented when the other component carriers are located in the same band as the anchor carrier. Otherwise, the path loss difference between carriers may be significant and the aggregation level on the anchor carrier may not imply the same or close aggregation level on the other carriers.

In other implementations, it may be desirable for UA 10 to search the search space intelligently to reduce blind decoding and therefore increase battery life. Any such search algorithms, while not impacting the capability of UA 10 to decode the entire search space as defined by the standard, may affect the performance of the UA. For example, upon detection of a PDCCH candidate on the anchor carrier, UA 10 may search each of the non-anchor carriers using the aggregation level found on the anchor carrier, and then search other aggregation levels on the non-anchor carriers. Other intelligent searching algorithms are contemplated.

Solution 7

In still other embodiments, if UA 10 detects one of the more robust aggregation levels on an anchor carrier (e.g. 4 or 8), UA 10 may be configured to forego decoding the PDCCH on the non-anchor carriers. Here, it has been recognized that a robust aggregation level typically means that UA 10 does not have a good channel condition. For example, UA 10 may be located in the cell edge or moving very fast, thereby making multi-carrier operation less attractive. Such a decoding scheme can be configured per UA 10 or defined in a standard for normal operation. The threshold for the robust aggregation level may be signaled by access device 12 or may be predefined.

Solution 8

In still other embodiments a new DCI message is transmitted by access device 12 to indicate the aggregation levels on the non-anchor carriers to be decoded by UA 10. The message may use any of the message structures of FIG. 5 for each carrier or for each non-anchor carrier. For example, if UA 10 has four non-anchor carriers, then a new 16 bit DCI message (one instance of FIG. 5a for each non-anchor carrier) may be used based on the message structure of FIG. 5a to indicate the aggregation levels to be searched on the non-anchor carriers.

This system implementation may be used when UA 10 may have multiple assignments in the UA-specific search space. If access device 12 is configured such that UA 10 can only have one assignment in the UA-specific search space, a 4-bit message may be used to indicate the exact PDCCH candidate that UA 10 should decode. Similarly, a 2-bit message could be used to indicate the aggregation level UA 10 should decode.

The new DCI message may only be needed when access device 12 is making a multi-carrier allocation. If there is only traffic on the anchor carrier for a particular UA 10, then the new DCI message may not be needed. Finally, if UA 10 did not detect the new DCI message from the UA-specific search space of the anchor carrier, UA 10 may not search the PDCCHs from the UA-specific search space of the remaining carriers or may search a more limited subset of the normal PDCCH search space of the remaining carriers.

Similarly, a new field may be added to one or more existing DCI formats to indicate the specific aggregation levels on the next carriers to be decoded by UA 10. For instance, a DCI message on an anchor carrier may indicate that only aggregation levels 2 and 4 should be searched for a next active carrier and a DCI message on the next active carrier may indicate that only aggregation level 8 should be searched on the following carrier and so on. The encoding of the new field may be in accordance with the 2-bit, 4-bit, and 6-bit implementations as discussed above.

Solution 9

In some embodiments, in the common search space, UA 10 does not need to decode the PDCCH on all carriers for some RNTIs. For example, the system information RNTI (SI-RNTI), paging RNTI (P-RNTI), and random access RNTI (RA-RNTI) may only be blind decoded on the anchor carrier. Because UA 10 may be configured to not decode DCI format 1C in the non-anchor carriers, it is contemplated that such a system implementation would reduce the number of blind decodes.

Solution 10

In still other implementations the DCI candidates on a carrier K are restricted by successfully decoded DCI formats on carrier K−1. For example, if a UA 10 is configured to search for DCI format 2 and the UA 10 detects DCI format 2 on its anchor carrier, then UA 10 may be programmed to only perform blind decoding using DCI format 2 on the remaining active carriers. This may only be possible for certain DCI formats.

Solution 11

If power control is defined per carrier, higher layer signaling may be used to configure multiple transmission power control (TPC) indices that correspond to multiple carriers using a single control message for a single UA 10. Access device 12 may signal a TPC-index per carrier configured to a given UA 10. Alternatively, access device 12 may signal a TPC-Index of an anchor carrier, with each UA 10 calculating a TPC-index. In one implementation, UA 10 uses an equation, such as TPC-index of carrier c=TPC-index of anchor carrier+(c−c_a), where c_a is the carrier index of the anchor carrier. In one implementation, UA 10 only monitors DCI format 3/3A on a single component carrier, while being able to receive power control commands for multiple carriers.

Solution 12

In still other embodiments where a UA 10 is assigned a set of active carriers and one of the active carriers is assigned as an anchor carrier, UA 10 performs blind decoding using a decoding process (e.g., as described by the LTE Rel-8) or a slightly reduced blind decoding process on the anchor carrier as described above. UA 10 also performs blind decoding on any remaining active carriers (non-anchor carriers) using a reduced search space. The reduced search space may be established in any one of the ways described above. In one implementation, the step of decoding on the remaining active carriers is only performed if UA 10 successfully decodes one or more PDCCH candidates on the anchor carrier. If there is no traffic on the anchor carrier and there is traffic on one or more of the non-anchor carriers, one or more of the network components, such as an eNB or other access device 12 may use a dummy transmission on the PDCCH to trigger decoding on the non-anchor carriers. In other implementations, UA 10 decodes on any remaining active carriers whether or not UA 10 successfully decodes one or more PDCCH candidates on the anchor carrier.

In the present system, the reduced search space may be defined as a subset of the CCE subset candidates based on the RNTI of the UA 10. Alternatively, the search space may be defined using a linear congruential random number generator as described in LTE standards (See section 9 of 3GPP TS 36.213). In the present system, random number generation may be implemented using two different algorithms. First, the recursion may apply in the component carrier domain instead of the time domain. Second, the recursion may apply in the time domain as in LTE Rel-8. The initial value, however, may be a function of the RNTI and a component carrier index.

The control region consists of a set of CCEs, numbered from 0 to $N_{CCE,k,c}-1$ according to Section 6.8.2 in 3GPP TS 36.211, where $N_{CCE,k,c}$ is the total number of CCEs in the control region of sub-frame k of component carrier c. UA 10 shall monitor a set of PDCCH candidates for control information in every non-DRX sub-frame, where monitoring implies attempting to decode each of the PDCCHs in the set according to all the monitored DCI formats.

The set of PDCCH candidates to monitor are defined in terms of search spaces, where a search space $S_k^{(L)}$ at aggregation level $L \in \{1,2,4,8\}$ is defined by a set of PDCCH candidates. The CCEs for component carrier c corresponding to PDCCH candidate m of the search space $S_{k,c}^{(L)}$ are given by $$L\{(Y_{k,c}+m) \bmod \lfloor N_{CCE,k}/L \rfloor\}+i$$

where $Y_{k,c}$ is defined below, $i=0, \ldots, L-1$ and $m=0, \ldots, M^{(L,c)}-1$. $M^{(L,c)}$ is the number of PDCCH candidates to monitor in the given search space.

For the anchor carrier, UA 10 shall monitor each of the candidates $m=0, \ldots, M^{(L,c)}-1$. For the remaining carriers, UA 10 shall monitor aggregation levels and/or candidates as configured by RRC or as indicated by the PDCCH or as indicated by a MAC control element.

The UA 10 shall monitor one common search space at each of the aggregation levels 4 and 8 and one UA-specific search space at each of the aggregation levels 1, 2, 4, 8. The common and UA-specific search spaces may overlap.

The aggregation levels defining the search spaces are listed in table shown in FIG. 15. The DCI formats that UA 10 shall monitor depend on the configured transmission mode as defined in Section 7.1 in 3GPP TS 36.213.

Option 1

For the common search spaces, $Y_{k,c}$ is set to 0 for the two aggregation levels 4 and 8.

For the UA-specific search space $S_{k,c}^{(L)}$ at aggregation level L, the variable $Y_{k,c}$ is defined by $$Y_{k,c}=(A \cdot Y_{k-1,c}) \bmod D \;\; c=0$$

$$Y_{k,c}=(A \cdot Y_{k,c-1}) \bmod D \;\; c>0$$

Or $$Y_{k,c}=(A \cdot Y_{k-1,c}) \bmod D \;\; c=c_\alpha$$

$$Y_{k,c}=(A \cdot Y_{k,c-1}) \bmod D \;\; c \neq c_\alpha$$

where $Y_{-1,0}=n_{RNTI} \neq 0$, A=39827, D=65537 and $k=\lfloor n_s/2 \rfloor$, $n_s$ is the slot number within a radio frame. The RNTI value used for $n_{RNTI}$ is defined in section 7.1 in downlink and section 8 in uplink in 3GPP TS 36.213.

Option 2

For the common search spaces, $Y_{k,c}$ is set to 0 for the two aggregation levels 4 and 8.

For the UA-specific search space $S_{k,c}^{(L)}$ at aggregation level L, the variable $Y_{k,c}$ is defined by $$Y_{k,c}=(A \cdot Y_{k-1,c}) \bmod D$$

where $Y_{-1,c}=f(n_{RNTI},c) \bmod D \neq 0$, A=39827, D=65537 and $k=\lfloor n_s/2 \rfloor$, $n_s$ is the slot number within a radio frame. The RNTI value used for $n_{RNTI}$ is defined in section 7.1 in downlink and section 8 in uplink in 3GPP TS 36.213.

In some embodiments, $f(n_{RNTI},c)=n_{RNTI}+c$

In other embodiments, $f(n_{RNTI},c)=n_{RNTI} \cdot c$.

Figure 14:
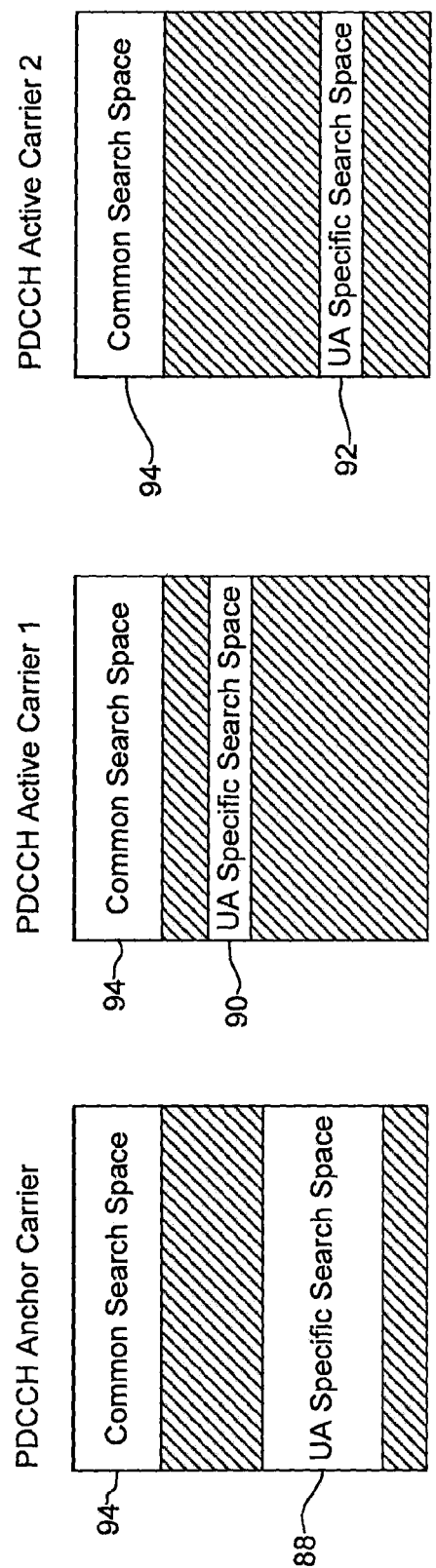
FIG. 14 is an illustration showing common and UA-specific search spaces for anchor carriers and other active carriers.

The above steps generate a search in both common and UA-specific spaces as depicted in FIG. 14 where clear space is searched and cross hatched space is not searched. The location of the UA-specific search spaces 88, 90, and 92 are random from carrier to carrier providing benefits for interference averaging. In contrast, the common search space 94 may be the same for all component carriers. In one implementation, UA-specific search space 88 in the anchor carrier may be as defined in LTE Rel-8. The UA-specific search spaces 90 and 92 in the remaining active carriers may be as small as one PDCCH candidate per aggregation level.

Solution 13

Figure 20:
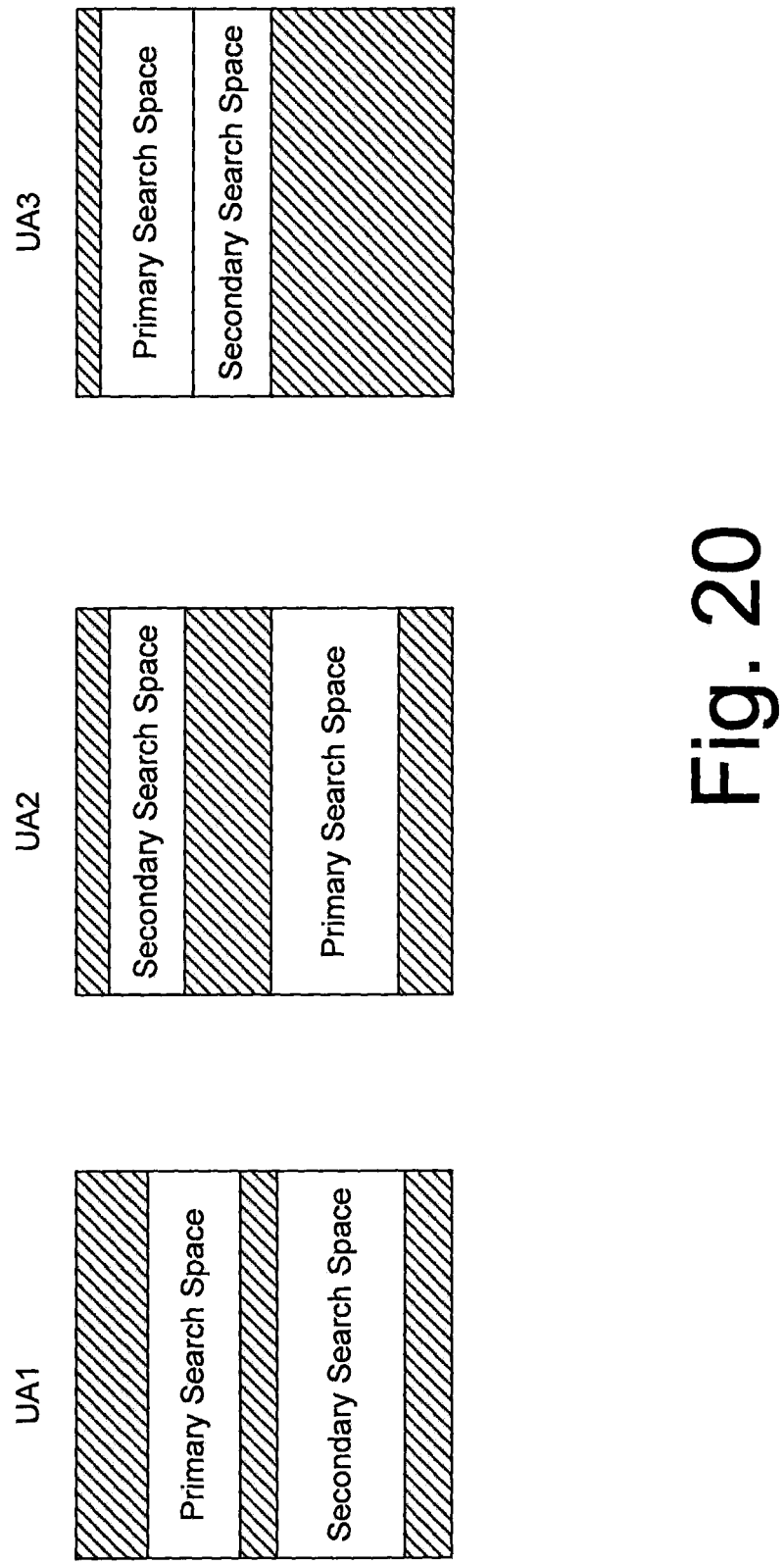
FIG. 20 is a diagram of a primary and secondary search space.

Another solution to reduce the number of blind decodings is to prioritize the blind decoding within the search space. Multiple search spaces can be defined for a UA. These search spaces may not be associated with a particular carrier. LTE Rel-8 defines one search space for a UA-specific messages as well as a common search space, which can be used for UA specific messages and broadcast messages. FIG. 20 shows an example of multiple search spaces. In the illustrated example, each of three separate UAs UA1, UA2 and UA3 is assigned two search spaces, denoted primary and secondary search spaces.

Different set of PDCCH candidates for each search space can be defined or same PDCCH candidates can be used. In other words, the aggregation levels and the number of PDCCH candidates used in the primary and secondary search space can be different. The same PDCCH candidates results in the same search space size. The locations of multiple search spaces may consist of different CCEs but the search spaces may also overlap each other. If multiple search spaces are located consecutively (i.e., the primary search space is defined by LTE Rel-8 method and the secondary search space is located right after the primary search space) or based on a fixed rule (e.g. the primary search space is defined by the LTE Rel-8 method and the secondary search space is located a fixed distance from the primary search space), an additional parameter to define the secondary search space should not be required. Otherwise, an additional parameter may be necessary to define multiple search spaces. This additional parameter to define the secondary search space can be signaled by higher layer signaling or fixed in a communication protocol specification. In some embodiments, only the primary search space includes a common search space. In some embodiments, the equations described above to determine the location of a search space for multiple component carriers based on a component carrier index c are modified so that they are based on a search space index, denoted ssi, simply by replacing c with ssi in the equations above.

The UA monitors the multiple search spaces at every sub-frame. In one embodiment, the primary search space is monitored first by the UA and the secondary search space is monitored if the UA cannot detect any DCI format with the same category in the primary search space. DCI formats having a similar purpose can be included in the same category. For example, DL DCI format configured with C-RNTI and DL DCI format configured with SPS-RNTI are used to schedule downlink resources, so they can be considered to be part of the same category. However, UL DCI format configured with C-RNTI is for allocating uplink resources so it would not be included in a same category as DL DCI format. In other embodiments, the primary search space is monitored first by the UA and the secondary search space is only monitored under certain conditions. For example, in some embodiments, the secondary search space is only monitored if the primary search space includes an instruction to monitor the secondary search space. In other embodiments, the secondary search space is not monitored if the UE detects any valid DCI format in the primary search space.

The eNB will be able to transmit PDCCH in the primary search space first if the primary search space is not overloaded and the UA will, in that case, only have to monitor the primary search space and this technique will reduce the number of blind decoding attempts by the UA.

In other embodiments, the primary search space is used to control the amount or type of blind decoding performed in the secondary search space. The above solutions can be applied to multiple search spaces on the same carrier. For example, in solution 5, the UA searches the anchor carrier for all aggregation levels. Upon detection of a valid PDCCH, the UA searches the remaining carriers using the aggregation level found on the anchor carrier and one or more other aggregation levels based on a rule as defined in the standard or defined using higher layer signaling. Extending this to multiple search spaces on the same carrier, the UA may search the primary search space for all aggregation levels. Upon detection of a valid PDCCH, the UA may search the secondary search space using the aggregation level found on the primary search space and one or more other aggregation levels based on a rule as defined in the standard or defined using higher layer signaling.

The size of the secondary search space can depend on the number of carriers configured at the UA. In some embodiments, the primary search space is used for carriers corresponding to a first transmission mode and the secondary search space is used for carriers corresponding to a second transmission mode. In some embodiments, the primary search space is used for carriers corresponding to a first bandwidth and the secondary search space is used for carriers corresponding to a second bandwidth. In some embodiments, the primary search space is used for one or more designated carriers (e.g. anchor carrier), and the secondary search space is used for one or more non-designated carriers (e.g. non-anchor carriers).

Figure 16:
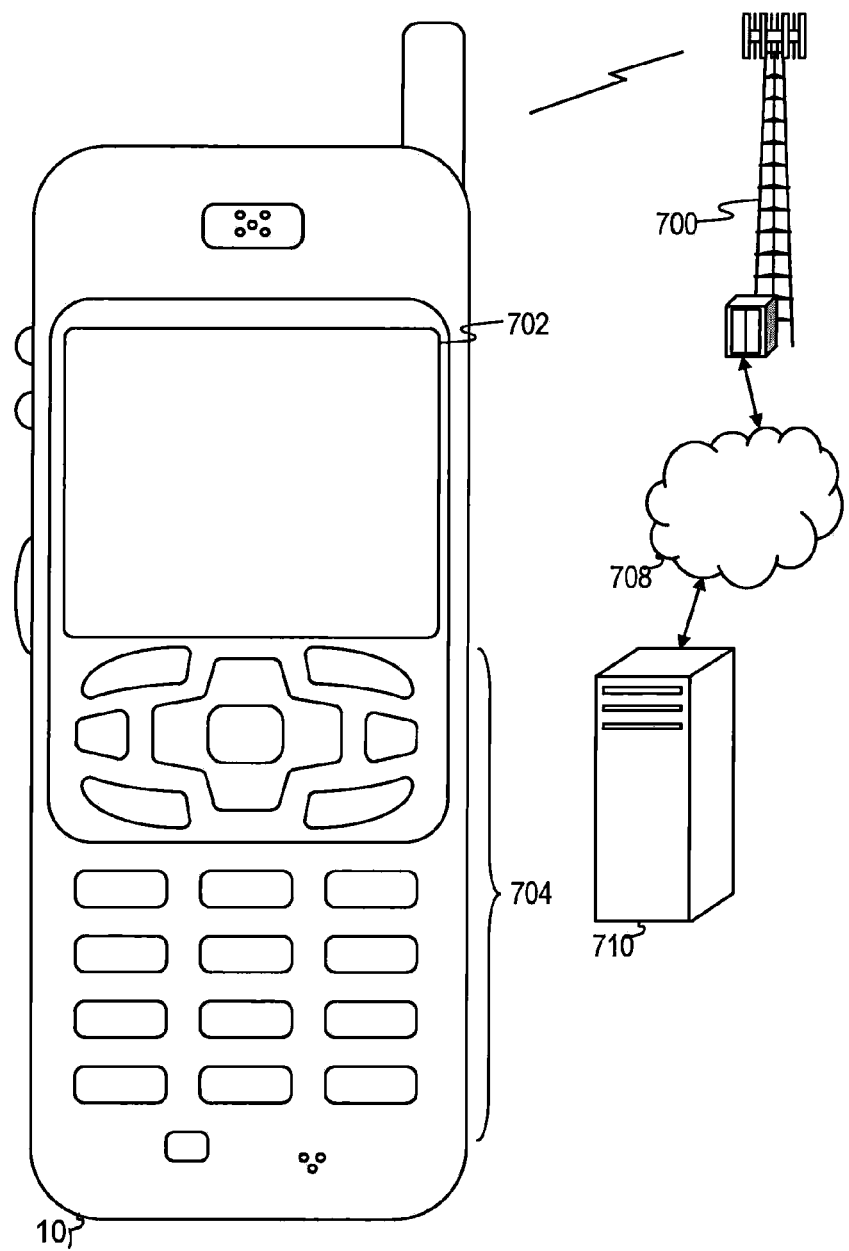
FIG. 16 is a diagram of a wireless communications system including a UA operable for some of the various embodiments of the disclosure.

FIG. 16 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 17:
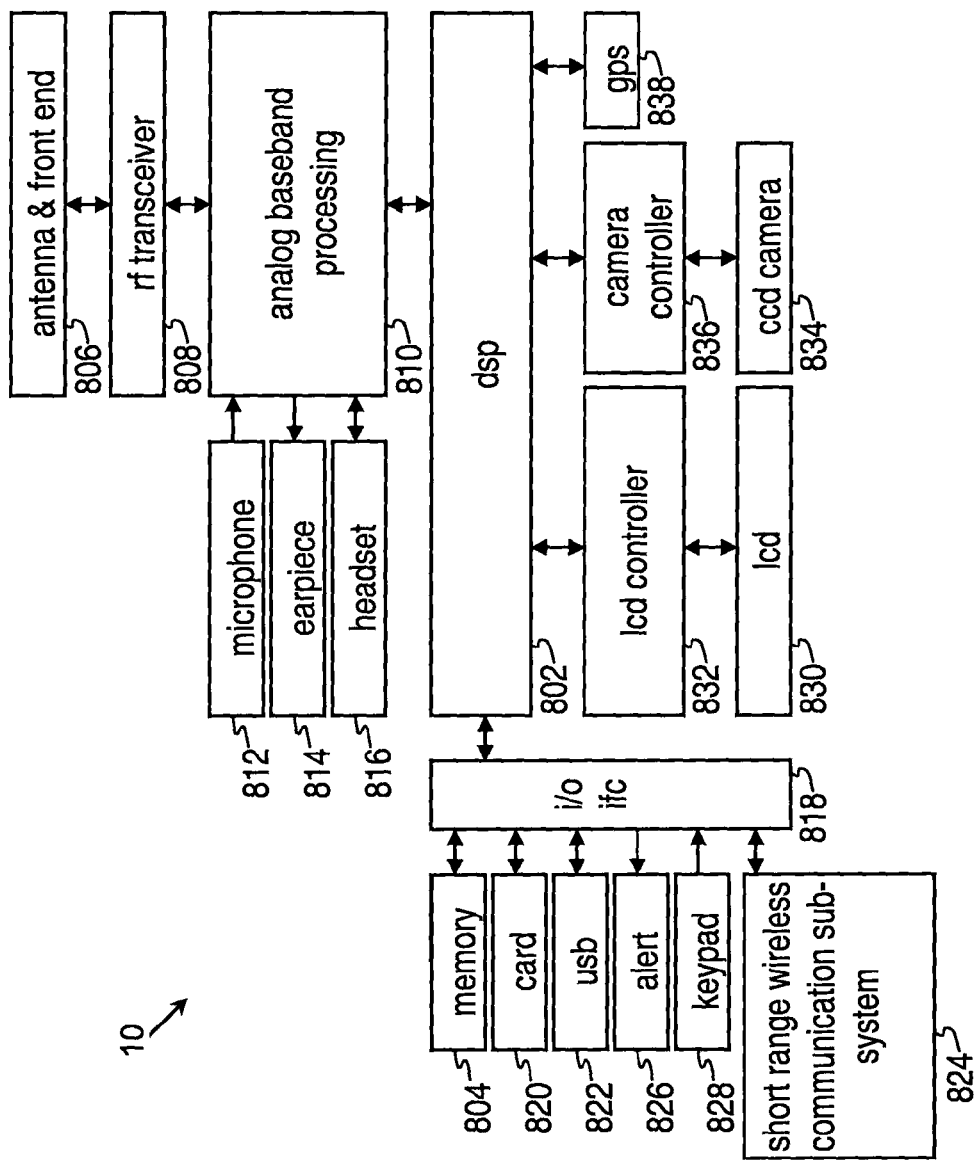
FIG. 17 is a block diagram of a UA operable for some of the various embodiments of the disclosure.

FIG. 17 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 18:
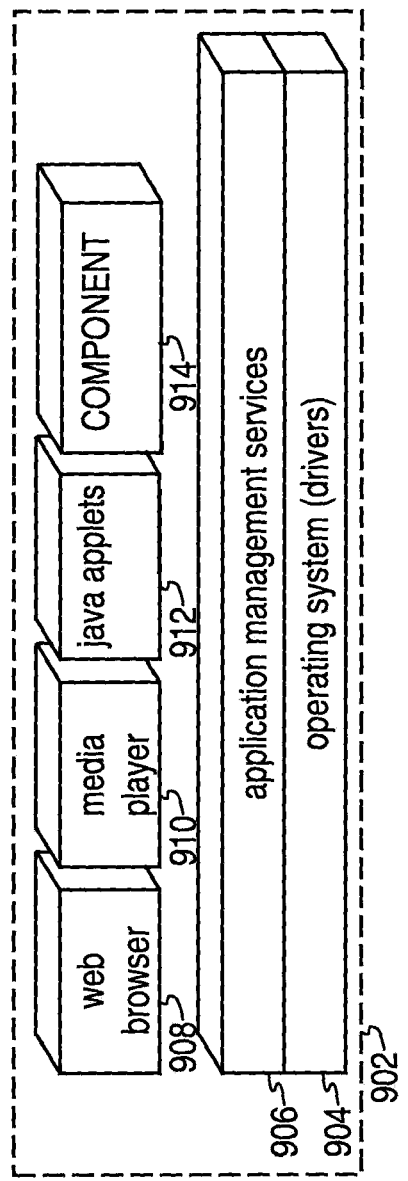
FIG. 18 is a diagram of a software environment that may be implemented on a UA operable for some of the various embodiments of the disclosure.

FIG. 18 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 18 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 19:
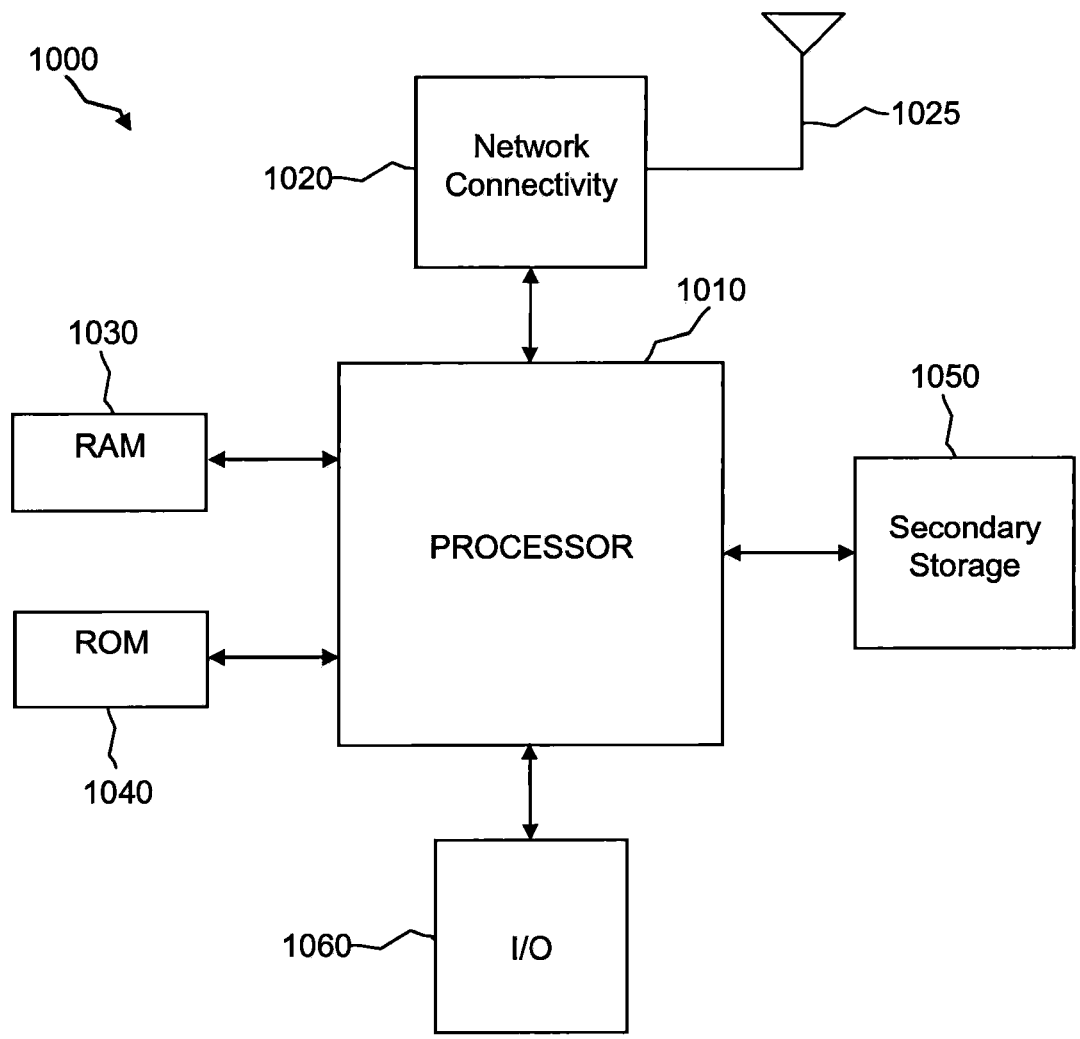
FIG. 19 is an illustrative general purpose computer system suitable for some of the various embodiments of the disclosure.

The UA 10, access device 120, and other components described above might include a processing component that is capable of executing instructions related to the actions described above. FIG. 19 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300, TS 36.211, TS 36.212 and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this invention, the following claims are made.

What is claimed is:

1. A method for processing a control channel at a user agent (UA) within a wireless communication system, the method comprising:

identifying one carrier as an anchor carrier and at least one other carrier as a non-anchor carrier, the anchor carrier and the at least one non-anchor carrier compatible with Long Term Evolution (LTE) carrier aggregation operations;

for each carrier:
  determining a location of a UA specific search space including one or more control channel candidates for the carrier based on a linear congruential random number, wherein each control channel candidate comprises at least one control channel element (CCE); and
  attempting to decode each of the control channel candidates in the UA specific search space to identify at least one of an uplink and a downlink grant associated with the carrier.

2. The method of claim 1 wherein the linear congruential random number is based on a carrier index.

3. The method of claim 1 further including the step of, where a control channel candidate is successfully decoded, using the grant to facilitate communication.

4. An apparatus for processing a control channel at a user agent (UA) within a wireless communication system, the apparatus comprising:
  a user agent including:
    a linear congruential random number generator; and
    a processor that is programmed to perform the steps of:
    identifying one carrier as an anchor carrier and at least one other carrier as a non-anchor carrier, the anchor carrier and the at least one non-anchor carrier compatible with Long Term Evolution (LTE) carrier aggregation operations; and
    for each carrier:
      determining a location of a UA specific search space including one or more control channel candidates for the carrier based on a linear congruential random number generated by the linear congruential random number generator, wherein each control channel candidate comprises at least one control channel element (CCE); and
      attempting to decode each of the control channel candidates in the UA specific search space to identify at least one of an uplink and a downlink grant associated with the carrier.

5. The apparatus of claim 4 wherein the linear congruential random number generator uses a carrier index as an input.

6. The apparatus of claim 4 wherein the processor is further programmed to perform the step of, where a control channel candidate is successfully decoded, using the grant to facilitate communication.

7. A method for processing a control channel at an access device within a wireless communication system for transmission to a user agent, the method comprising:
  identifying one carrier as an anchor carrier and at least one other carrier as a non-anchor carrier, the anchor carrier and the at least one non-anchor carrier compatible with Long Term Evolution (LTE) carrier aggregation operations; and
  for each carrier:
    determining a location of a UA specific search space including one or more control channel candidates for the carrier based on a linear congruential random number, wherein each control channel candidate comprises at least one control channel element (CCE); and
    using at least one of the control channel candidates to transmit at least one of an uplink grant and a downlink grant to a UA.

8. The method of claim 7 wherein the linear congruential random number is based on a carrier index.

* * * * *

UNITED STATES PATENT AND TRADEMARK OFFICE
CERTIFICATE OF CORRECTION

PATENT NO. : 8,494,454 B2  
APPLICATION NO. : 12/792098  
DATED : July 23, 2013  
INVENTOR(S) : McBeath et al.

Page 1 of 1

It is certified that error appears in the above-identified patent and that said Letters Patent is hereby corrected as shown below:

Title page item (57), Column 2 (Abstract), In Line 7, Delete "C of" and insert -- of C --, therefor.

Signed and Sealed this  
Third Day of June, 2014

Michelle K. Lee  
*Deputy Director of the United States Patent and Trademark Office*